May 1, 1934.  C. W. SIMPSON  1,957,235
SWAGED PUSHER AND METHOD OF MAKING THE SAME
Filed July 26, 1932  2 Sheets-Sheet 1
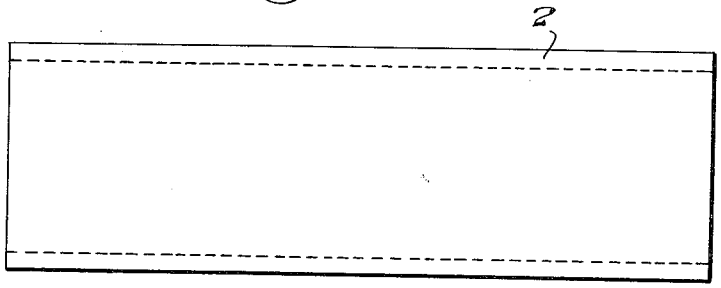
Fig. 2.  Fig. 1.
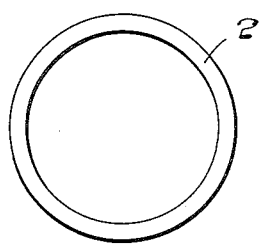
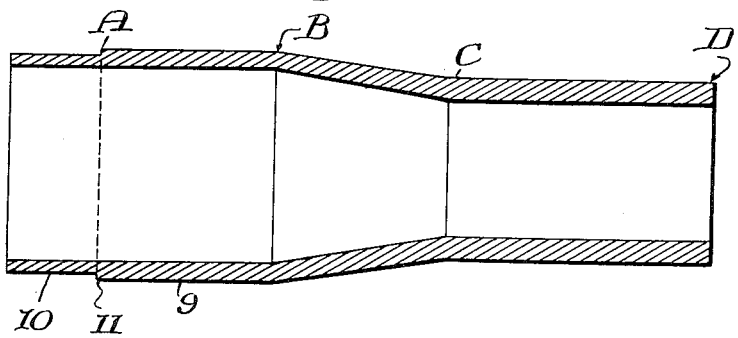
Fig. 4.  Fig. 3.
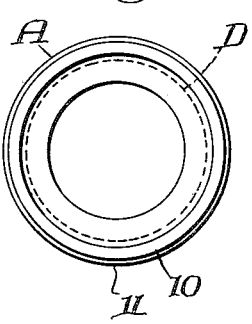
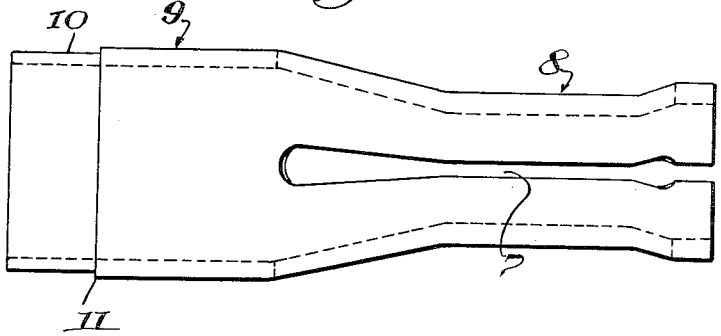
Fig. 6.  Fig. 5.
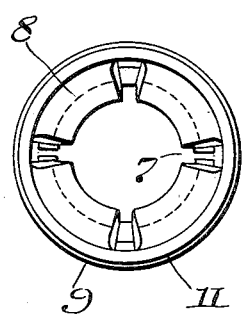
Inventor
Charlie W. Simpson
by his Attorneys May 1, 1934.                    C. W. SIMPSON                    1,957,235
                  SWAGED PUSHER AND METHOD OF MAKING THE SAME
                            Filed July 26, 1932              2 Sheets-Sheet 2
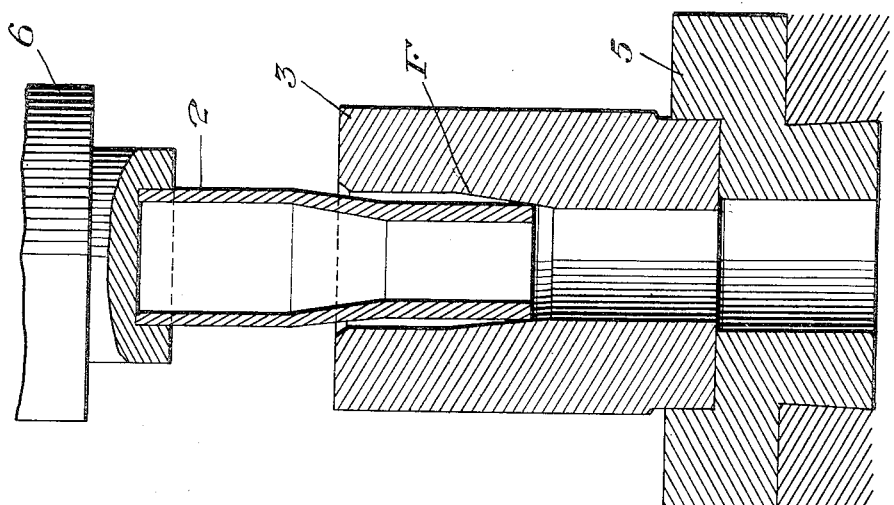
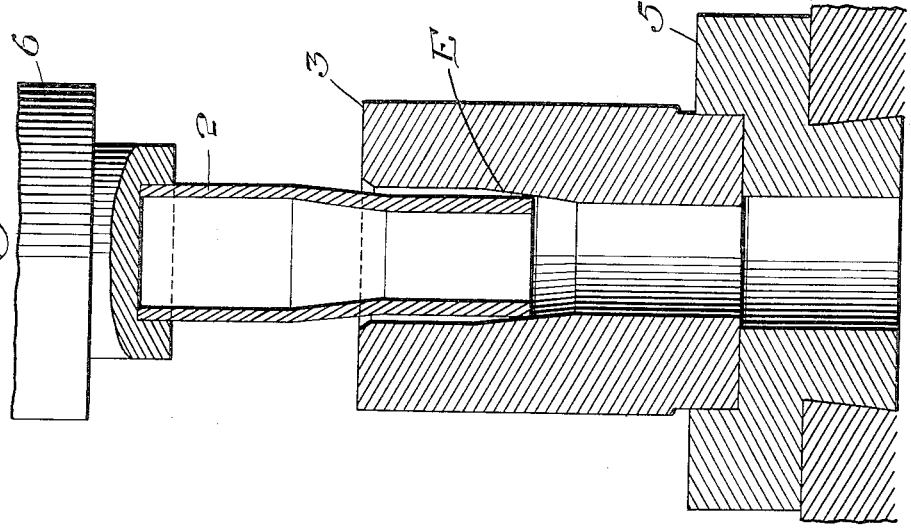
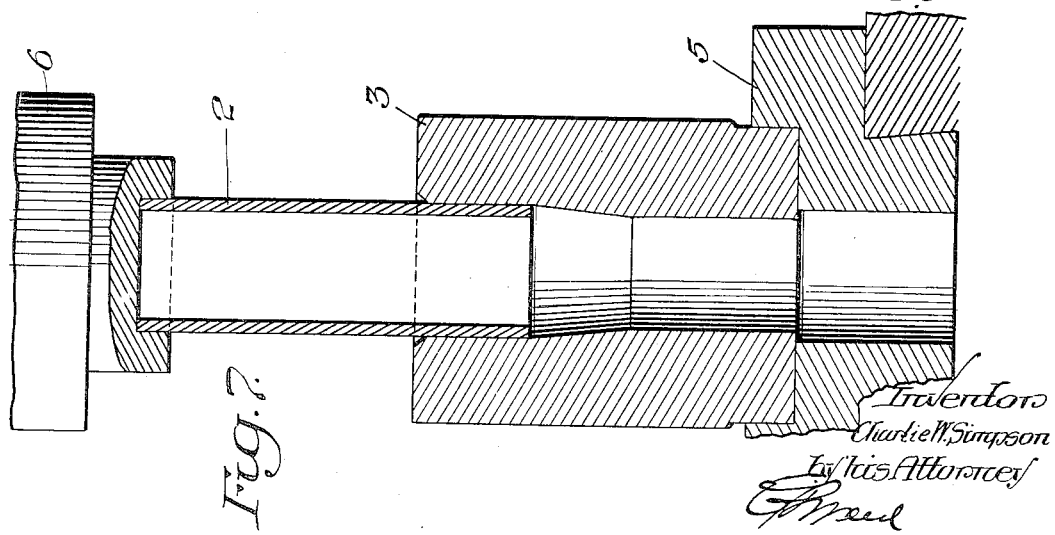

Patented May 1, 1934

1,957,235

UNITED STATES PATENT OFFICE 1,957,235

SWAGED PUSHER AND METHOD OF MAKING THE SAME

Charlie William Simpson, Windsor, Vt., assignor to The National Acme Company, Cleveland, Ohio, a corporation of Ohio Application July 26, 1932, Serial No. 624,745

20 Claims. (Cl. 29—62)

This invention relates to pushers or collets particularly adapted for use with metal working machines such as automatic or multiple spindle screw machines and other machines where a device of this kind is used, the object of the invention being to provide an improved pusher, more particularly a swaged pusher and method of making the same, and which pusher is inexpensive to manufacture, efficient in use and simple in construction and in which the spring fingers are so formed that they will have the necessary flexibility to enable them effectively to grasp the stock or work without affecting the durability of the fingers, whereby cracking, fracture or breaking off of the fingers is prevented.

As is well known, the pusher is a device used in connection with a feed tube for pushing a stock bar through a work spindle into position to be operated upon by the tool, while a collet is a device frequently used with a pusher for gripping the stock bar after it has been pushed forward by the pusher and both are commonly made with spring fingers.

The difficulty with the spring fingers of these devices has always been that they crack and fracture or break off or bend where they join the body so that the life of the device is comparatively short requiring frequent replacements.

The usual and common way of making these devices is either to bore out a solid bar into round tubular form and then slit it to form the fingers or to take a tubular bar and slot it to form the spring fingers but the difficulty has been to give the fingers just sufficient flexibility or spring properly to conform to the work and yet prevent the cracking or fracturing of those fingers at the bases thereof, and the problem has been a difficult one owing to the fact that the fingers have a cross sectional curved form so that the strain thereon is different at different points. Thus, as the fingers are arc shaped and, therefore, necessarily curved or convex transversely of their length at the juncture points thereof with the body of the collet or pusher, because the device is necessarily bored cylindrically, the strain all comes at the corners of each finger so that there are thus two forces working against each other, a compression and an expansion, trying to tear the finger apart from its base or body. In other words, in this arc or curved form of finger the strain is acting to compress the finger at the height of the curve or midway between the side edges of the finger while tending to expand or stretch it beyond its elastic limit at the outer corners of the finger adjacent to the slots and these two forces working in opposition quickly cause the fracture or cracking and consequent breaking of the finger at the juncture point thereof with its body.

To make a satisfactory long-lived article of this kind with spring fingers having the proper flexibility when the fingers are arc-shaped has been difficult of accomplishment. No matter how the device is heat treated, the fingers being curved transversely have comparatively little flexibility or spring and therefore quickly fracture or break.

Various methods of heat treatment have been tried to prevent this without success which, together with the cost of making the collet or pusher, has made them highly expensive due to the frequent renewals necessary.

Therefore, the object of the present improvement is to overcome these difficulties by eliminating the cause for the cracking and fracturing of the fingers and thus provide a collet or pusher in which the fingers have all the flexibility necessary so that the device will stand up better and hence be stronger and longer-lived. Practical tests have shown that the present improvement overcomes, to a large extent, the difficulties referred to.

I have discovered that by increasing the thickness of the metal throughout the length of the fingers as compared with the body of the pusher, the disadvantages hereinbefore referred to are largely overcome since the thickening of the spring section of the pusher and the reducing of the body portion of the pusher seems to give greater flexibility to the spring fingers and reduces the liability of fracture or breakage thereof where they join the body and I have discovered also that if this thickening is done by swaging, the result is a highly efficient pusher overcoming the difficulties of former pushers, especially in the larger sizes of pushers.

In the present improvement a tubular bar either formed from a solid bar or originally formed tubular, is subjected to a series of swaging operations while in a heated condition with the result that the walls of the tube where the fingers are located are increased in thickness.

In the drawings accompanying and forming a part of this specification, Fig. 1 is a side view of a tube cut to length to form the pusher.

Fig. 2 is an end view thereof.

Fig. 3 is a longitudinal sectional view of the pusher after it has been swaged.

Fig. 4 is an end view thereof.

Fig. 5 is a longitudinal view of the completed pusher.

Fig. 6 is a front end view thereof.

Fig. 7 illustrates the first step in the method of swaging the pusher, and

Figs. 8 and 9 are successive steps when it is desired to increase the reduction of the tube and increase the thickness of the walls thereof which would be desirable in certain sizes of pushers.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawings since the invention is capable of other embodiments, and that the phraseology which I employ is for the purpose of description and not of limitation.

In the present improvement a tube 2 such as shown in Fig. 1, cut to proper length and having the walls thereof of uniform thickness throughout is then heated to a sufficient temperature for swaging and placed in the die 3 suitably shaped to conform to the shape the pusher is to have.

This die is of heavy section, high carbon, hardened steel held rigidly on a solid base 5. By means of a ram 6, the heated tube 2 is forced down into the tapered portion of the die whereupon a reduction in the diameter of the tube takes place starting at D, Fig. 3, and continuing to B, Fig. 3, over the entire length of the finger section, the tube being given a tapered form from C to B and being held to size or of the same diameter from C to D.

By this method of forcing the tube into the die and starting the reduction at the extreme end of the tube, the wall of the tube is thickened but is not allowed to lengthen. In other words, the force applied to the rear end of the tube tends to flow the stock in the wall into a thicker section as the diameter is reduced.

This step of the process permits the tube to be reduced to a certain point and if a further reduction is required the process must be repeated, as illustrated in Figs. 8 and 9, in which case, the tube must be reheated in each instance and then forced into dies having less diameter at E and F, Figs. 8 and 9, as compared with the diameter of the die shown in Fig. 7, thereby giving a steeper taper in each instance.

The result of these successive steps is a correspondingly thicker wall as the diameter of the tube is reduced, and by this method I obtain the required wall thickness from B to C and C to D, Fig. 3, which results in increased strength and spring tension being given to the pusher while the wall thickness from A to B remains the same and of original uniform thickness.

Thus it will be observed that the swaging action takes place from the front end of the pusher inwardly and toward the body located between A and B, Fig. 3, resulting in increasing the thickness of the finger section of the pusher and giving added strength and spring tension thereto with the result also that, because of this added strength and spring tension, there is less likelihood of fracture and bending of the spring fingers in the use of the pusher.

After the pusher has been swaged in the manner described, the finger end thereof is then slotted as at 7 with the desired number of slots to form spring fingers 8, these slots extending rearwardly from the front end toward the body of the pusher and the body 9 of the pusher is usually reduced as at 10 to form a shoulder 11 and this reduced portion is commonly threaded for attachment of the pusher in position for operation.

Thus, by this method of forming the pusher, I thicken the walls of the spring section of the pusher where the greatest strain comes and increase the durability and effectiveness of the pusher.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A collet or pusher for a metal working machine having a plurality of swaged and slotted fingers.

2. A collet or pusher for a metal working machine having a plurality of swaged and slotted spring fingers.

3. A swaged collet or pusher for a metal working machine having a plurality of slotted spring fingers.

4. A swaged collet or pusher for a metal working machine having a plurality of slotted spring fingers having increased thickness of metal from end to end thereof.

5. A swaged collet or pusher for a metal working machine having a plurality of slotted spring fingers and a body and therebetween a tapered portion having an increased thickness of metal.

6. A swaged collet or pusher for metal working machines having a body with the walls thereof of uniform thickness and of certain diameter, a front end of less diameter and connected with the body by a tapered portion, said tapered portion having the wall thereof of increased thickness, said front end slotted to form spring fingers.

7. A swaged collet or pusher comprising a body of predetermined diameter with walls of uniform thickness terminating in a slotted spring finger section comprising a front end of less diameter than the body and connected with the body by a tapered portion, the spring finger section having walls of increased thickness as compared with the walls of the body.

8. The method of forming a collet or pusher which consists in subjecting a tube cut to length and heated to a swaging temperature to endwise pressure in a die shaped to impart a tapered section to the tube and to reduce the diameter of the tube, thereby to increase the thickness of the walls thereof, and then slotting the reduced end thereof to form spring fingers.

9. The method of forming a collet or pusher which consists in cutting a tube to proper length, subjecting it to swaging temperature and then exerting endwise pressure thereon in a die to reduce the diameter of the tube and increase the thickness of the walls thereof, and then slotting the reduced end thereof to form spring fingers.

10. The method of forming a collet or pusher which consists in cutting a tube to proper length, subjecting it to swaging temperature and then exerting endwise pressure thereon in a die to reduce the diameter of the tube and increase the thickness of the walls thereof, and at the same time tapering a section of the tube between the front and rear ends thereof, and then slotting the reduced end thereof to form spring fingers.

11. The method of forming a collet or pusher which consists in cutting a tube to a predetermined length, subjecting it to swaging temperature and then reducing the diameter of the tube by endwise exterior lateral pressure from one end thereof inward, thereby to reduce the diameter of the tube and increase the thickness of the walls thereof, and then slotting the reduced end thereof to form spring fingers.

12. The method of forming a collet or pusher which consists in cutting a tube to a predetermined length, subjecting it to swaging temperature and then reducing the diameter of the tube by endwise exterior lateral pressure from one end thereof inwardly, thereby to reduce the diameter of the tube and increase the thickness of the walls thereof while maintaining a portion of the tube of the original diameter with walls of uniform thickness, and then slotting the reduced end thereof to form spring fingers.

13. The method of forming a collet or pusher which consists in cutting a tube to a predetermined length and then heating it to a swaging temperature and subjecting it to a swaging operation, thereby to reduce the diameter of the tube throughout a predetermined portion thereof and to increase the thickness of the walls thereof, and then slotting the reduced end thereof to form spring fingers.

14. The method of forming a collet or pusher which consists in cutting a tube to a predetermined length, then successively heating it to swaging temperatures and intermediate such heating steps successively swaging it to step by step reduce it to less diameter while gradually increasing the thickness of the walls thereof, and then slotting the reduced end thereof to form spring fingers.

15. The method of forming a collet or pusher which consists in cutting a tube to a predetermined length, then successively heating it to swaging temperatures and intermediate such heating steps successively swaging it to step by step reduce it to less diameter while gradually increasing the thickness of the walls thereof, and simultaneously tapering an intermediate section of the tubing, and then slotting the reduced end thereof to form spring fingers.

16. The method of forming a collet or pusher which consists in cutting a tube to a predetermined length, heating it to a swaging temperature and then subjecting it to a swaging operation to reduce the diameter of a portion thereof and taper a portion of such reduced portion thereby to increase the thickness of the walls of the reduced portion, and then slotting the reduced end thereof to form spring fingers.

17. The method of forming a collet or pusher which consists in cutting a tube to a predetermined length, heating it to a swaging temperature and then subjecting it to a swaging operation to reduce the diameter of a portion thereof and taper a portion of such reduced portion thereby to increase the thickness of the walls of the reduced portion and then slotting the reduced portion of the tube to form spring fingers, and then slotting the reduced end thereof to form spring fingers.

18. The method of forming a collet or pusher which consists in cutting a tube to a predetermined length, heating it to a swaging temperature and then subjecting it to a swaging operation to reduce the diameter of a portion thereof and taper a portion of such reduced portion thereby to increase the thickness of the walls of the reduced portion and then repeating the heating and swaging steps to further reduce the diameter of the reduced portion and further increase the thickness of the walls thereof, and then slotting the reduced end thereof to form spring fingers.

19. The method of forming a collet or pusher which consists in cutting a tube to a predetermined length, heating it to a swaging temperature and then subjecting it to a swaging operation to reduce the diameter of a portion thereof and taper a portion of such reduced portion thereby to increase the thickness of the walls of the reduced portion and then repeating the heating and swaging steps to further reduce the diameter of the reduced portion and further increase the thickness of the walls thereof and then slotting the reduced portion of the tube to form spring fingers.

20. A collet or pusher having a body portion and a slotted spring finger portion having a part of uniform diameter and a part of tapered form, the spring finger portion having throughout the major portion thereof less diameter than the body portion and also having the walls thereof of increased thickness of metal as compared with the walls of the body portion, such increased thickness being obtained by a swaging operation.

CHARLIE WILLIAM SIMPSON.